No. 835,078. PATENTED NOV. 6, 1906.
L. NATHAN.
MANUFACTURE OF VESSELS.
APPLICATION FILED MAR. 27, 1906.
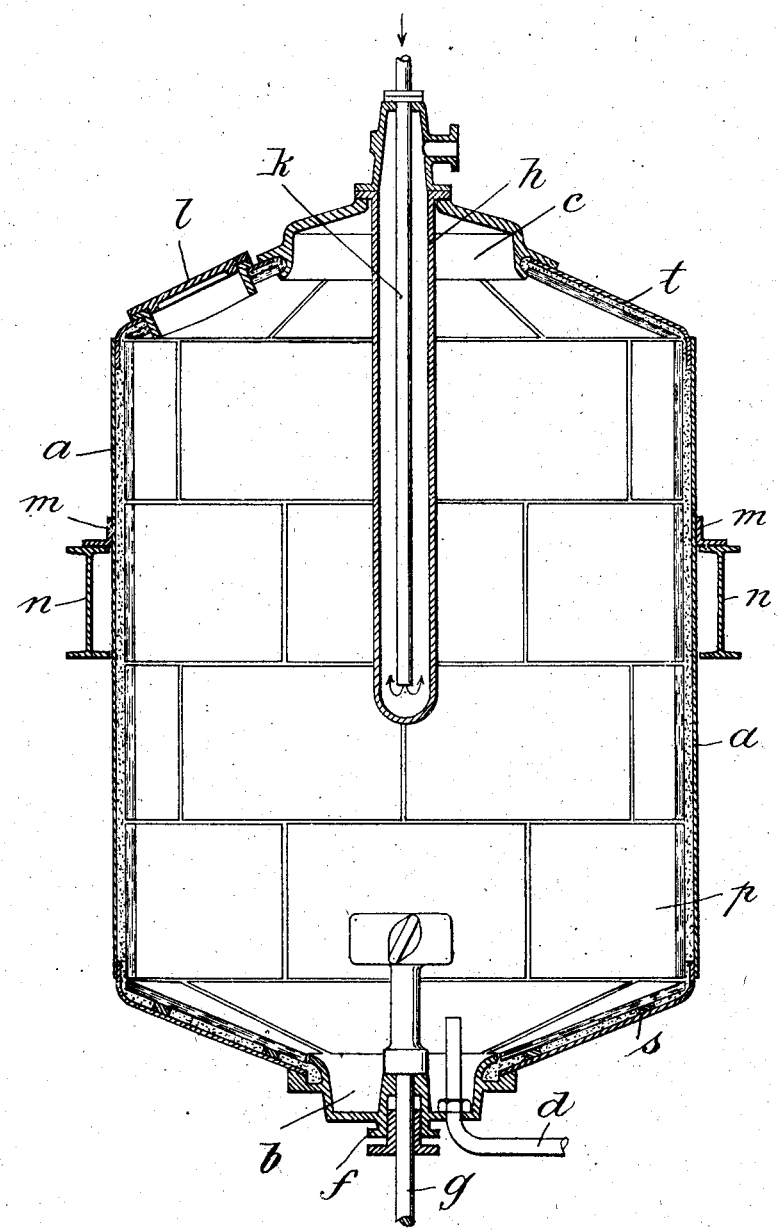
Witnesses:
John Lotka
John A. Kehlenbek
Inventor
Leopold Nathan
By Briesen Knauth
Attorneys.

UNITED STATES PATENT OFFICE.

LEOPOLD NATHAN, OF ZURICH, SWITZERLAND.

MANUFACTURE OF VESSELS.

No. 835,078.  Specification of Letters Patent.  Patented Nov. 6, 1906.

Application filed March 27, 1906. Serial No. 308,239.

*To all whom it may concern:*

Be it known that I, LEOPOLD NATHAN, managing director and a resident of 104 Ausstellungsstrasse, Zurich, Switzerland, have invented new and useful Improvements in the Manufacture of Vessels, of which the following is a specification.

My invention relates to the construction of vessels, particularly of very large sizes, and has for its object to facilitate the mounting of such vessels, reduce the cost of mounting them, and produce them with smooth inner surfaces, so that they may be cleansed and sterilized more readily.

In the adjoined drawing a section through the vessel is shown.

$a$ is a cylindrical shell, preferably made out of wrought-iron plates. $c$ is a top piece, preferably of cast-iron. Between this top peice and the shell $a$ there is a conical top plate $t$, connected with the top piece and the shell. $b$ is a bottom piece, connected by the conical plate $s$ with the shell $a$. $l$ is an opening closed by a removable cover. $h$ is a pipe into which is fed a heating or cooling agent by the pipe $k$. $d$ is a pipe for admitting the liquid to be treated into the vessel. $g$ is the shaft of a rotating stirrer, which enters into the vessel by the stuffing-box $f$. The vessel is supported by a flange $m$, fixed at the shell $a$, and by beams $n$. It is understood that other fixings and appurtenances might be added, as further pipes, thermometers, peep-holes, and the like. The inner surface of this vessel must have a smooth lining without fissures, which may be easily sterilized by steam or other agents and easily be scrubbed with a brush. For this purpose the top piece $c$ and the bottom piece $b$, as well as the cover of the hole $l$ and the pipe $h$, are enameled in a well-known manner. Enameling the other parts of the vessel is very difficult and expensive, and transportation of the enameled vessel is difficult if it is very large.

The lining of the shell $a$ and of the plates $s$ and $t$ consists of glass plates, which are shaped cylindrical or conical to fit the iron hull. These plates are made of considerable size, too, as large as the handling and transportation allows in order to get a minimum of joints between the plates. In a vessel of two meters diameter I use six glass plates in one horizontal series. These plates are fixed to the hull by an intermediate layer of cement mortar. The glass plates are joined together by a good lute or mastic cement of the kind used in dentistry.

When building up my new vessel, I prefer to proceed as follows: The iron hull is mounted with exception of the top piece. Then the glass plates are built up at the proper distance from the hull, about one centimeter, and the proper distance from one another, of about one millimeter. These joints are filled provisionally with plaster to prevent the cement mortar from entering the joints and showing at the inner surface of the vessel. This would be prejudicial in handling beer and other liquids, as this cement mortar is not acid-proof. To secure the accurate distances, it has been found advantageous to use little distance-blocks of paraffin, placed in the joints. The liquid cement mortar, which must not increase in volume while hardening, is then poured into the room left between the hull and the glass plates. After the cement mortar is hardened the plaster is removed from the joints between the glass plates, and these joints are filled with the said cement mastic, which must be acid-proof and increase in volume when hardening. For the cement mortar I prefer to use one part of Portland cement and three parts of sand. The cement mastic may consist of oxyphosphate of zinc, eighty-five parts; alumina, 8.5 parts; silicic acid, 4.5 parts; feldspar, one part; soda, .4 part; lime, .6 part; total, one hundred parts. I prefer to have an air-pressure of, say, one-half to one atmosphere in the vessel afterward to drive the cement mastic deeper into the joints and to fill all cavities. The joints are then ground and polished to be flush with the glass plates. I prefer to use white glass to better show dirt on the surface. The entire inner surface of the vessel might be polished after finishing.

I am aware that glass plates have been used to build up vessels, especially in the way of small glass tiles and of great even plates, and I am aware also that cement mortar has been used as a layer between metal walls and a lining. The hull may of course be built of other suitable material of sufficient strength.

It will be noted that the layer of cement serves not only to hold the glass plates $p$ on the shell $a$ and on the conical members $s$ $t$, but also to connect the end pieces $b$ $c$ with the structure formed by said shell and conical members. The glass plates $p$ are arranged in rows extending transversely—that is, the lines separating the rows extend around the vessel—and the joints which run lengthwise of the vessel are broken or staggered, as clearly shown in the drawings.

What I claim, and desire to secure by Letters Patent, is the following:

1. A vessel comprising a hull and a lining of resistant plates on the inside of said hull, said plates being arranged in continuous rows or rings arranged transversely of the vessel.

2. A vessel comprising a hull and a lining of resistant plates on the inside of said hull, said plates being arranged in continuous rows or rings arranged transversely of the vessel, the longitudinal edges of such plates being arranged in break-joint fashion.

3. A vessel comprising a cylindrical shell, conical members at the ends of said shell, and a lining consisting of continuous rows or rings of plates of resistant material arranged on the inside of said shell and conical members respectively.

4. A vessel composed of a sheet-metal hull, a cast-iron enameled top piece, a cast-iron enameled bottom piece, a glass lining of the hull and a layer of cement uniting the glass lining with the hull and top and bottom pieces.

5. A process of building up a vessel as described by placing the glass plates into the hull at a distance from it, closing the joints between the glass plates and pouring cement mortar into the room between the hull and the glass plates.

6. A process of building up a vessel which consists in building up a complete continuous inner wall or lining within the vessel at a distance from the inner surface thereof, and then filling the space between said lining and the inner surface of the vessel.

7. A process of building up a vessel which consists in building up within the vessel, and at a distance from the wall thereof, a continuous lining of a resistant material, filling the space between said lining and the vessel proper, and applying pressure within the vessel to drive the binder into the joints.

8. A process of building up a vessel which consists in building up within the vessel, at a distance from the inner surface thereof, a continuous lining of resistant material, with a binder at the joints of the pieces or plates constituting said lining, filling the space between the lining and the vessel proper, and grinding and polishing the joints so as to make them flush with the inner surface of the lining.

9. A process of building up a vessel which consists in building up within the vessel, at a distance from the inner surface thereof, a continuous lining of resistant material, with a temporary binder at the joints of the pieces or plates constituting said lining, filling the space between the lining and the vessel proper with a cement which does not expand upon hardening, then removing the temporary binder from the joints of the lining, and filling said joints with a cement which expands upon hardening.

10. A vessel comprising a resistant hull, a cylindrical lining of curved glass plates within the hull but spaced therefrom, a filling for the joints of said plates which consists of a cement expanding upon hardening, and a layer of cement which does not expand upon hardening, interposed between said lining and the hull.

11. A vessel comprising a cylindrical hull of resistant material, a continuous cylinder located within the hull but spaced therefrom and formed of curved glass plates with a filling material at the joints, and a cylindrical layer of cement between said hull and the glass lining.

In testimony that I claim the foregoing as my invention I have signed my name, in presence of two witnesses, this 24th day of February, 1906.

LEOPOLD NATHAN.

Witnesses:
 HENRY HASPER,
 WOLDEMAR HAUPT.